July 1, 1947.  C. W. EARP  2,423,088
DISTANCE MEASURING SYSTEM
Filed March 13, 1943
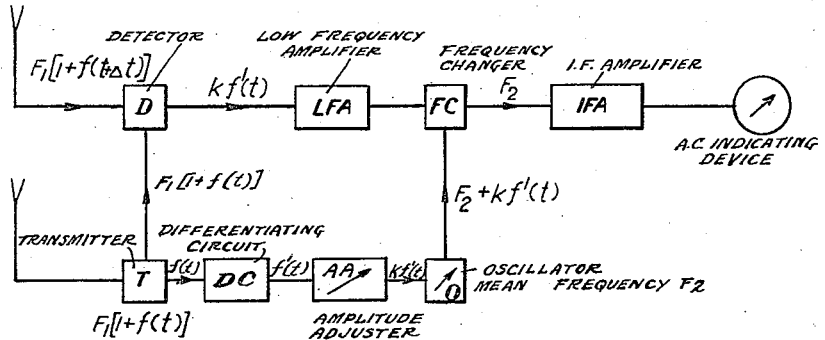
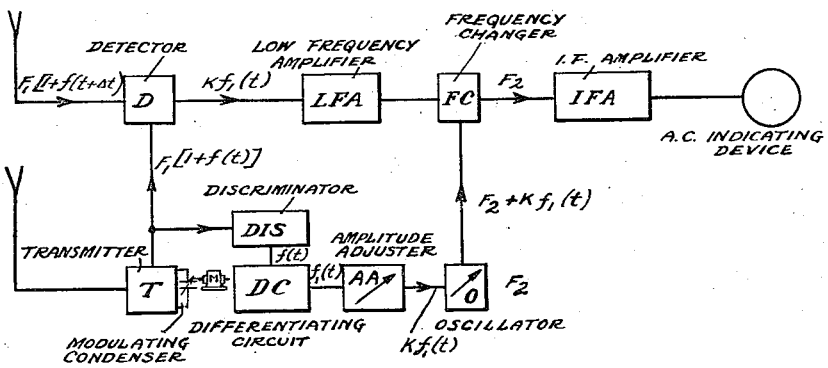
Inventor
C. W. Earp.
By Loyd Hall Sutton
Attorney Patented July 1, 1947

2,423,088

UNITED STATES PATENT OFFICE 2,423,088

DISTANCE MEASURING SYSTEM

Charles William Earp, London W. C. 2, England, assignor to Standard Telephones and Cables Limited, London, England, a British company Application March 13, 1943, Serial No. 479,122
In Great Britain April 3, 1942

6 Claims. (Cl. 250—1.68)

The present invention relates to obstacle detection arrangements of the kind utilising electromagnetic waves which are cyclically frequency modulated or swept, and in which a beat frequency signal is obtained between the contemporaneous transmitted wave and the received wave after reflection from an obstacle.

In the most commonly used system for obstacle detection by a frequency-modulated or swept radio transmission, the frequency of the transmitter is modulated, or swept cyclically, according to a symmetrical linear wave form. The reflected signal provides a similar wave, which is, however delayed in time according to the transit-time to and from the obstacle. On detecting a reflected signal with local oscillation from the transmitter a nominally constant-frequency beat note is obtained, the frequency of this beat note giving an indictaion of the distance of the reflecting object.

One serious limitation of the known system described above, is that it is not practical to produce a perfectly linear frequency-sweep. Furthermore, at the extreme edges of the transmitter frequency excursion, the beat note descends rapidly to zero frequency, then increases rapidly to the nominally constant beat frequency during the major portion of the opposite direction part of the sweep. Still further, the wave-trains produced on successive sweeps are not coherent in phase; according to the exact distance of the reflecting object, an indeterminate phase-shift is produced between the wave-trains corresponding to successive sweeps of frequency. For the above reasons, the nominally constant beat frequency is not a single frequency, but corresponds to a complex spectrum of frequencies. It is not possible, therefore, to make use of a narrow band receiver with the object of reducing noise and producing a better signal to noise ratio.

It is one object of this invention to provide receiving arrangements for any form of frequency sweep in which the same effect is produced as if a perfectly linear frequency sweep were used.

More generally, it is the object of this invention to provide receiving arrangements which convert the beat-note betwen transmitted and received signals to a pure constant-frequency sine wave, independent of the wave form with which the transmitter has been frequency modulated. The arrangements permit the use of any wave form for the frequency modulating wave, one particularly useful form being a pure sine-wave sweep.

A further object of the present invention is to provide the maximum possible reduction of noise, by the use of a narrow-band receiver.

A further object of the invention is to remove the distortion of signals caused by the "Doppler effect," i. e. distortion caused by the fact that there is a relative movement between the obstacle and detecting apparatus. By means of the arrangements according to the present invention the "Doppler" frequency may conveniently be measured to give an accurate indication of relative velocity between obstacle and detecting apparatus.

According to the invention obstacle detection arrangements of the kind utilising electromagnetic waves which are cyclically frequency modulated or swept between frequency limits and in which the beat frequency signal is obtained between the contemporaneous transmitted wave and the received wave after reflection from an obstacle are characterised in this, that means are provided for converting the said beat-frequency into a pure constant frequency sine wave.

According to another aspect of the invention, obstacle detection arrangements utilising electromagnetic waves which are cyclically frequency modulated or swept between frequency limits and in which the beat-frequency signal is obtained between the contemporaneous transmitted wave and the received wave after reflection from an obstacle are characterised in this, that means are provided for modulating the tuning of the receiver with respect to the said beat frequency.

The invention will be better understood from the following description taken in conjunction with the accompanying drawing, Figs. 1 and 2 of which show in block schematic form two circuit arrangements of obstacle detecting systems incorporating the invention.

Referring now to Figure 1 of the accompanying drawing, the block schematic shown differs only from a known frequency-sweep obstacle detection arrangement by the provision of the frequency changing oscillator O, which is frequency modulated.

The transmitter T radiates the mean frequency $F_1$ and carries also a frequency modulation according to any waveform $f(t)$. (For sine wave sweep $f(t)$ may be $k \sin wt$.)

The signal reflected from an obstacle is received on the frequency $F_1[1+f(t+\Delta t)]$, and this is detected in D with the contemporaneous transmitted wave to yield a beat note whose frequency is proportional to the rate of change of transmitted frequency. The frequency of the detected signal may, therefore, be written down as $Kf^1(t)$, where $f^1(t)$ is the first differential of $f(t)$ with respect to time and $k$ is a constant determined by the distance of the reflecting object. (In the case of sine-wave sweep of the transmitter, this frequency may be written down as $k \cos wt$.) LFA is a low frequency amplifier.

The mean frequency of the frequency changing oscillator O is F2, and this is frequency modulated by a wave whose amplitude of frequency swing depends upon the distance of the obstacle to be detected, and whose form is the first differential coefficient with respect to time of the transmitter frequency sweep. The actual frequency of the oscillator O may be $$F_2 + kf^1(t)$$

Detection between the beat wave $kf^1(t)$ and this oscillator in F. C. yields the constant beat frequency $F_2$. The intermediate frequency amplifier I. F. A. is therefore tuned to frequency $F_2$. Band-width of this amplifier may be reduced indefinitely according to the signal to noise ratio required, or according to the time available for operation.

It will be observed that during the frequency cycle of the oscillator O, the frequency may pass through $F_2$, and this may directly excite the amplifier I. F. A. It is desirable, therefore, to make F. C. into the well-known balanced type of modulator in which the oscillator injection does not tend to appear at the output. If, in a practical development, the necessary degree of balance were difficult to achieve, then the output from the oscillator O may be injected through a frequency selective network which rejects frequency $F_2$, but which passes the adjacent frequency band on either side of it. Such arrangements should, however, be avoided if possible, since they introduce amplitude modulation and if said arrangements are used the output of the frequency changer should be maintained constant, for example, by raising the signal level in L. F. A. as this will avoid the imposition of amplitude modulation of the signal in I. F. A.

Another method for solving the difficulty is to choose a value of excursion for the oscillator O which provides an overall frequency spectrum not containing the exact frequency $F_2$. For a sine-wave ($\sin wt$) frequency sweep of F1 it is easy to show that the "carrier wave" $F_2$ may be exactly cancelled by a critical frequency modulation $k \cos wt$ of F2. When following this procedure, obstacles at different distances will be detected by a control of the transmitter frequency excursion $F_1 f(t)$ so as always to produce the same beat frequency $F_2$.

The effect of a moving obstacle will be to add or subtract the Doppler frequency $(d)$ to the received signal. This, in turn, displaces the beat-note $kf^1(t)$ to $kf^1(t)+d$. Such a signal may be correctly received, either by retuning I. F. A. to $(F_2-d)$, or $(F_2+d)$ or by retuning the mean frequency $F_2$ of the oscillator O by an amount $d$. The extent of detuning of IFA or O will then provide a measure of the "Doppler" frequency $(d)$.

When carrying out this invention in practice, the transmitter frequency may conveniently be modulated by electronic means. In such a case, $f^1(t)$ may be derived from the frequency modulating wave $f(t)$ by passing the latter through a simple differentiating network DC composed of a resistance and a condenser connected in series. If the reactance of the condenser is large compared with the resistance for all frequencies contained in $f(t)$, then the voltage appearing across the resistance will be proportional to $f^1(t)$. The amplitude of this voltage is adjusted by the amplitude adjuster AA to make the amplitude of frequency sweep $(F_2+kf^1(t))$ of the oscillator O equal to the amplitude of the difference frequency sweep $kf^1(t)$ from the low frequency amplifier LFA. When this condition exists the output of the frequency changer will be a pure wave of frequency $F_2$, to which the intermediate frequency amplifier IFA is tuned, and the output of the amplifier IFA will be a maximum, the magnitude of the output of IFA may be determined by any known indicating means such as an A. C. meter. The setting of the amplitude adjuster AA may be calibrated to provide an indication of the distance of the obstacle since the amplitude of the frequency swing $kf^1(t)$ is proportional to the distance. The voltage from the amplitude adjuster AA may be employed to frequency modulate the oscillator O in any known manner.

When a pure sine-wave is used as $f(t)$, $f^1(t)$ is of course provided by a simple 90° phase shifter in the place of the differentiating circuit DC.

If the transmitter frequency is modulated by a rotating condenser which is continuously driven by a motor M, some of the transmitter output may be applied to a known frequency discriminator DIS, Figure 2, to provide $f(t)$, from which $f^1(t)$ may be derived by a differentiating circuit DC comprising the resistance and condenser arrangement referred to hereinbefore.

It will be readily appreciated that the system described provides an unusual freedom from jamming. Any wave-form may be used to frequency modulate the transmitter. This waveform may, for example, be a speech wave, which could not readily be used by anyone without the knowledge of the wave-form.

What is claimed is:

1. Obstacle detecting system utilizing electromagnetic waves comprising transmitting means for generating a cyclically frequency modulated wave, means for radiating said frequency modulated wave, means for receiving said frequency modulated wave after reflection by an obstacle, means for combining said received wave with a wave derived directly from said transmitting means to produce a beat frequency wave whose frequency is proportional to the rate of change of transmitted frequency and whose amplitude of frequency swing depends upon the distance of the obstacle, differentiating means for deriving from said transmitting means a voltage which varies according to the first differential with respect to time of the frequency modulating wave form, an oscillator, an amplitude adjuster, a frequency changer, means for applying said derived voltage over said amplitude adjuster to said oscillator to obtain a frequency modulated output therefrom, means for applying said beat frequency wave and the output of said oscillator to said frequency changer, indicating means, selective means tuned to the mean frequency of said oscillator, and means including said selective means for connecting said indicating means to the output of said frequency changer.

2. Obstacle detecting system utilizing electromagnetic radiation comprising transmitting means for generating a frequency modulated wave, means for radiating said frequency modulated wave, means for receiving said frequency modulated wave after reflection by an obstacle, means for combining said received wave with a wave derived directly from said transmitting means to produce a beat frequency wave, means for deriving from said transmitting means a wave whose form is the first differential coefficient with respect to time of the transmitter frequency sweep, an oscillator, means for frequency modulating said oscillator with said last-mentioned wave, means for adjusting the amplitude of the frequency sweep of said oscillator, a frequency changer, means for combining said beat frequency wave and the output wave of said oscillator in said frequency changer, indicating means, selective means tuned to the mean frequency of said oscillator, and means including said selective means for connecting said indicating means to the output of said frequency changer.

3. Obstacle detecting system utilizing electromagnetic waves comprising transmitting means for generating a wave of mean frequency $F_1$ cyclically frequency modulated by a modulating wave form $f(t)$, means for radiating said frequency modulated wave, means for receiving said frequency modulated wave after reflection by an obstacle, means for combining said received wave with a wave directly derived from said transmitting means to produce a beat frequency wave whose frequency $kf^1(t)$ is proportional to the rate of change $f^1(t)$ of the transmitted wave, a differentiating circuit, means for deriving from said transmitting means the modulating wave form $f(t)$ and applying it to said differentiating circuit to obtain a voltage which varies in accordance with the rate of change of frequency $f^1(t)$, an oscillator having a mean frequency $F_2$, an amplitude adjuster, means for applying said voltage through said amplitude adjuster to said oscillator to obtain a frequency modulated wave $F_2+kf^1(t)$ therefrom, frequency changing means for combining said last mentioned wave with said beat frequency wave to produce resultant waves, indicating means, selective means tuned to pass the frequency $F_2$, and means including said selective means for connecting said indicating means to said frequency changing means.

4. Obstacle detecting system according to claim 3, wherein said selective means is tunable about the mean frequency $F_2$ of the oscillator.

5. Obstacle detecting system according to claim 3 wherein the frequency of said oscillator is adjustable about the mean frequency $F_2$.

6. Method of detecting obstacles which comprises radiating electromagnetic waves of a mean frequency $F_1$ cyclically frequency modulated by a modulating wave form $f(t)$, receiving said frequency modulated wave after reflection by an obstacle, combining said received wave with a wave directly derived from the radiated wave to produce a beat frequency wave whose frequency $kf^1(t)$ is proportional to the rate of change $f^1(t)$ of the transmitted wave and whose amplitude of frequency sweep depends upon the distance of the obstacle, deriving from the radiated wave a voltage which varies in accordance with the rate of change of frequency of the modulating wave form $f(t)$, utilizing said voltage to frequency modulate a further source of waves of a different mean frequency $F_2$, combining the said beat frequency wave and said frequency modulated further source of waves of mean frequency $F_2$ and selecting from the resultant the component of frequency $F_2$, detecting the component of frequency $F_2$ in an indicating means, adjusting the amplitude of said voltage to obtain a maximum response in said indicating means and deducing the distance of the obstacle from said last-mentioned adjustment.

CHARLES WILLIAM EARP.

REFERENCES CITED

The following references are of record in the file of this patent:

UNITED STATES PATENTS

| Number | Name | Date |
| --- | --- | --- |
| 2,206,903 | Lane et al. | July 9, 1940 |
| 2,253,975 | Guanella | Aug. 26, 1941 |